March 28, 1939.  W. HENNING ET AL  2,152,050
OPTICAL INSTRUMENT
Filed June 18, 1936   5 Sheets-Sheet 5
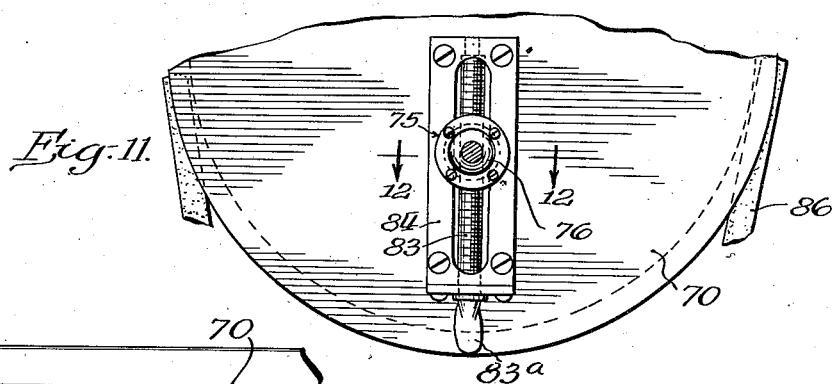
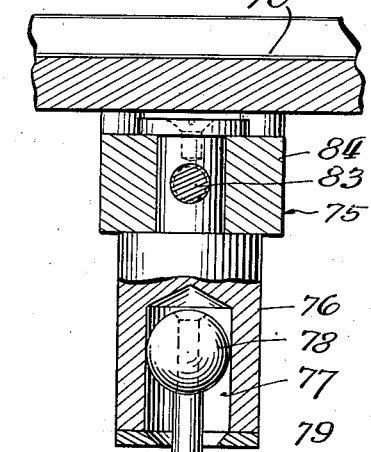
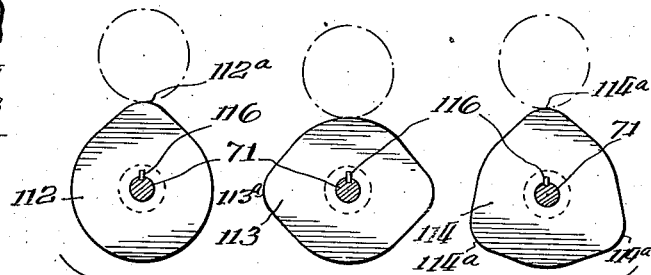
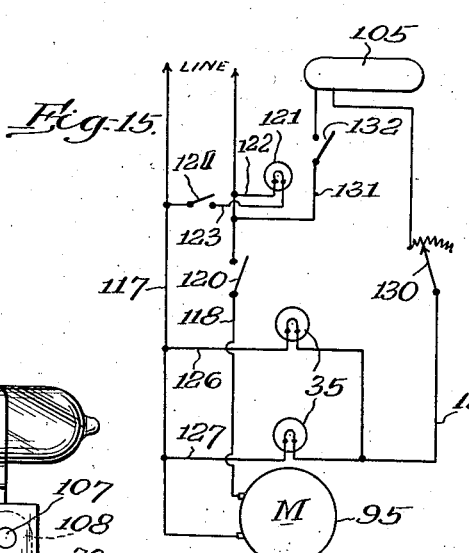
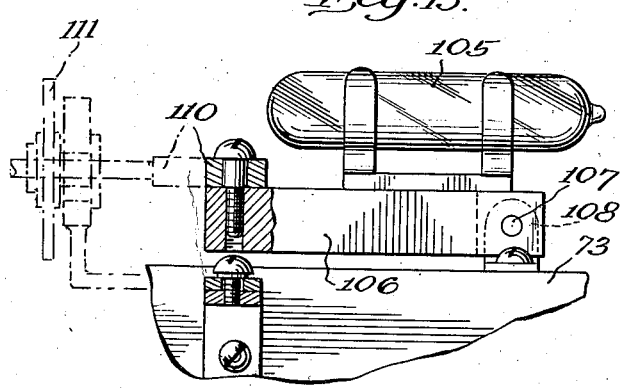
Inventors.
William Henning
Milton Bursack
Carl Loeb Patented Mar. 28, 1939

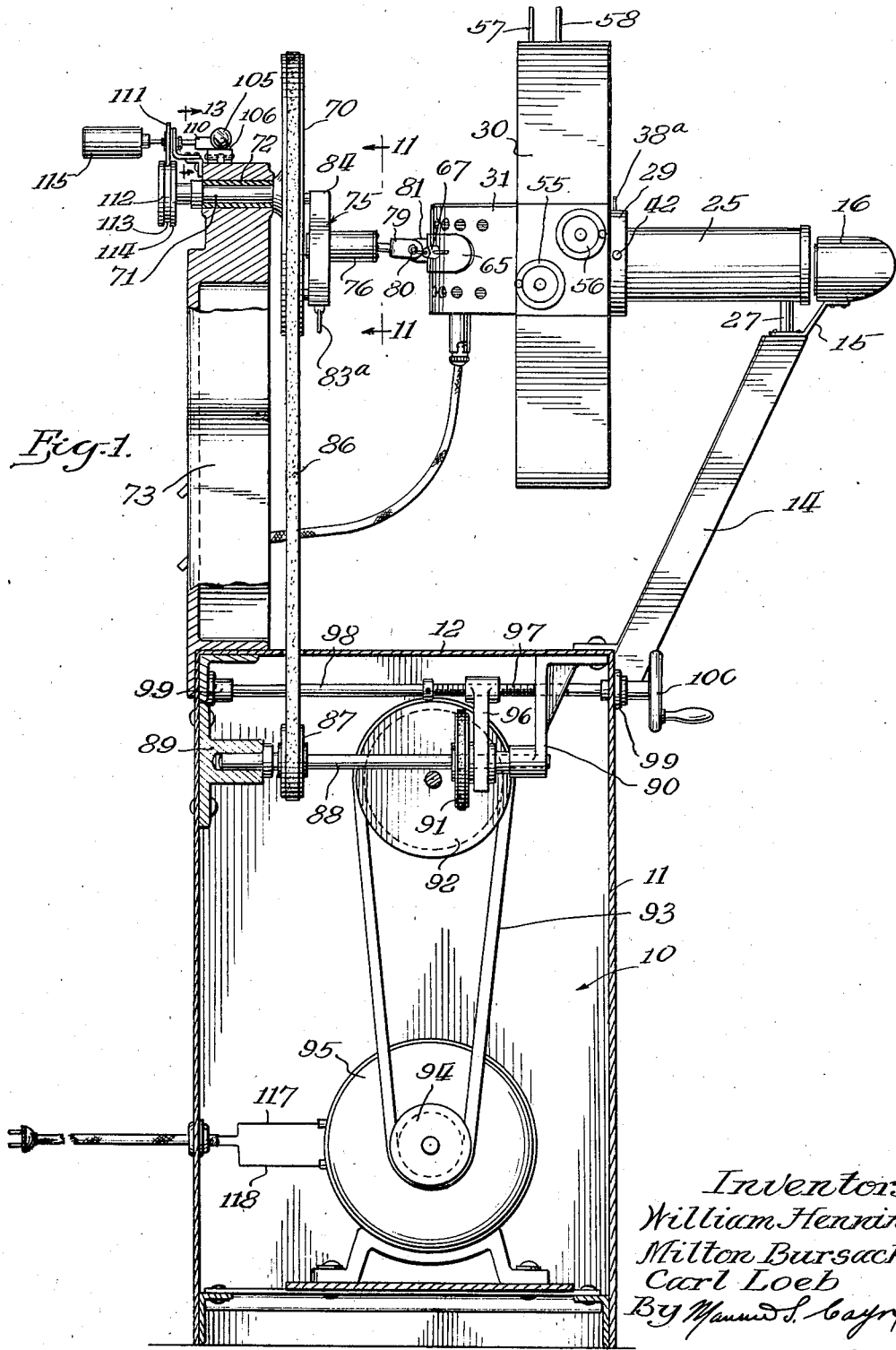

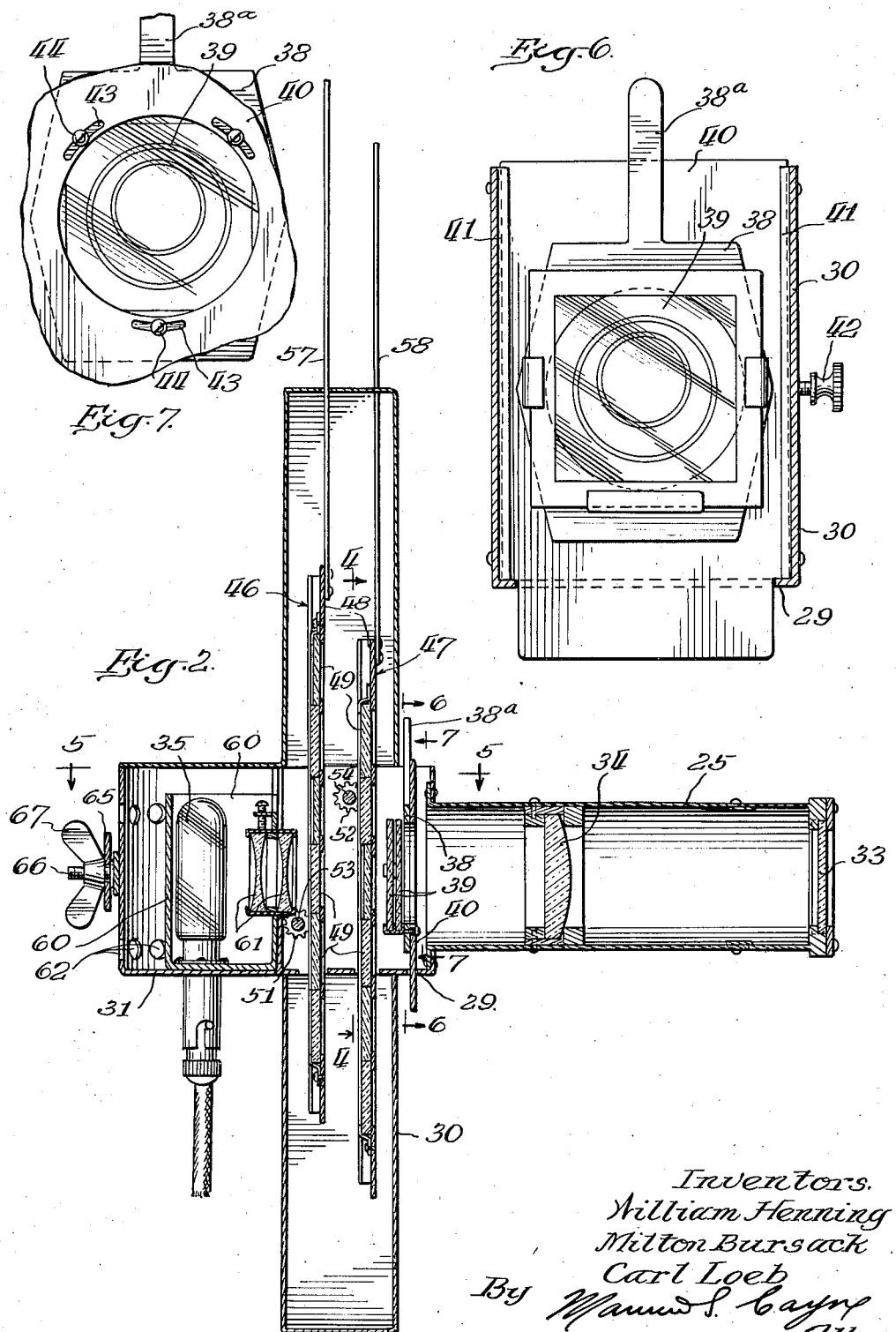

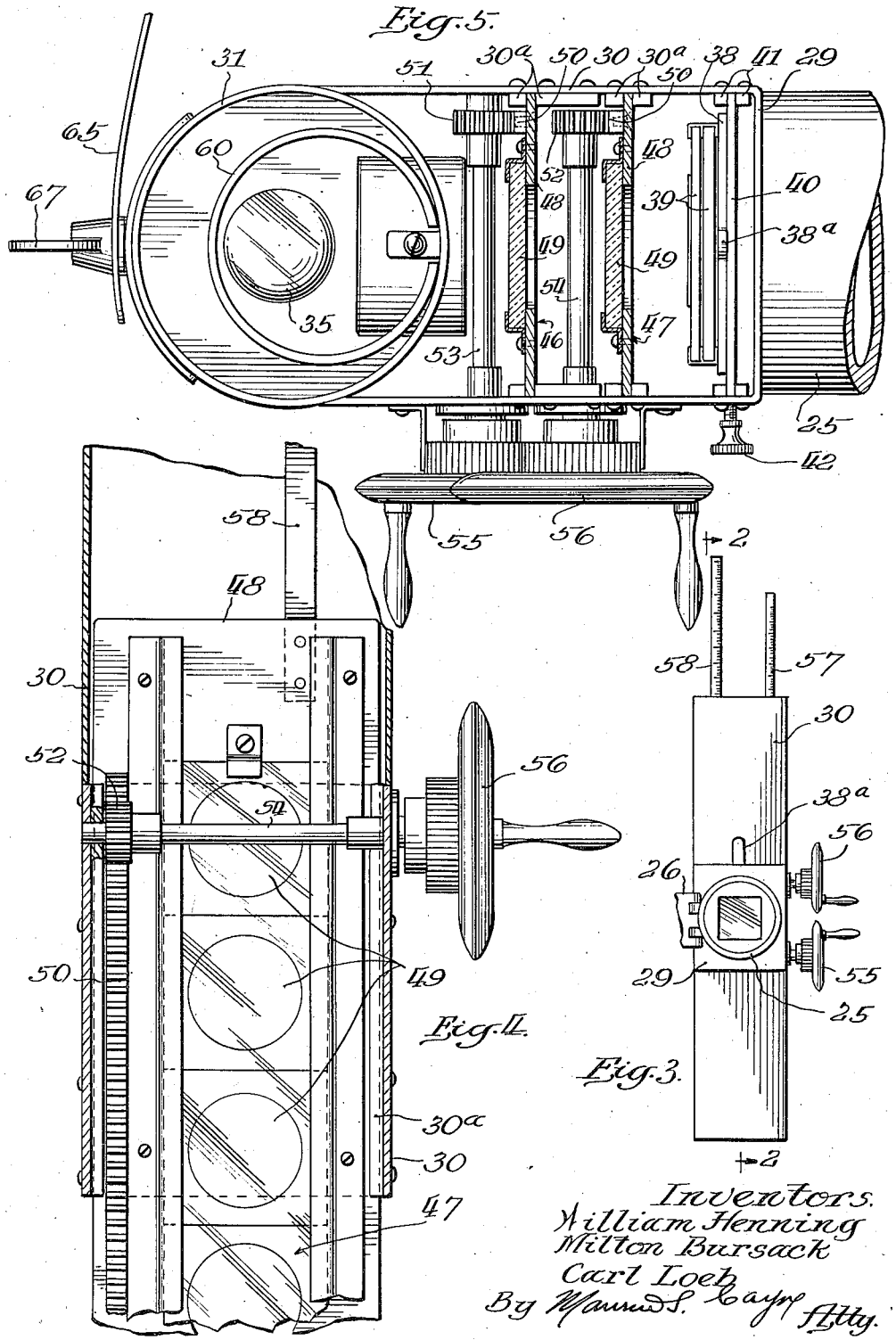

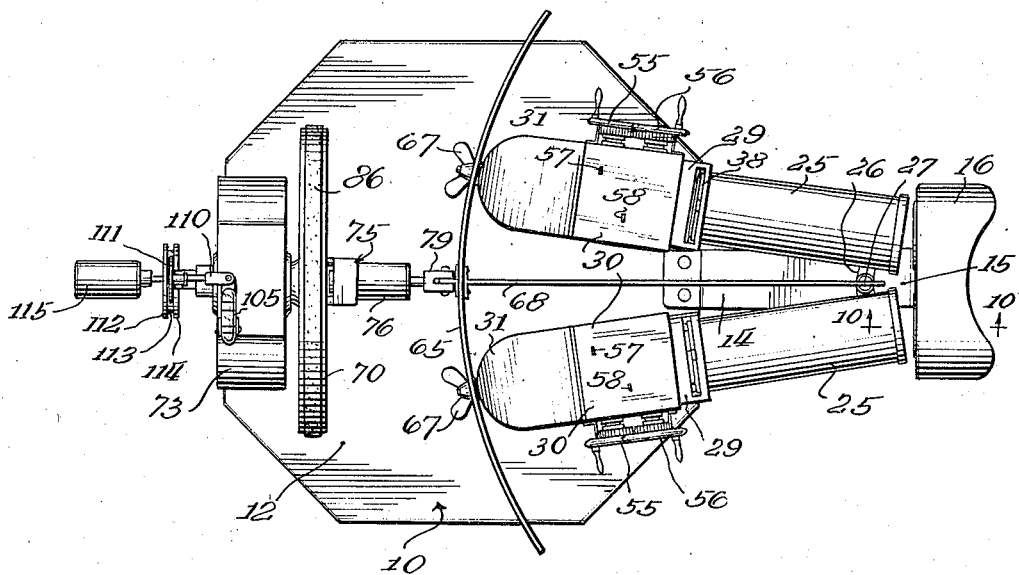
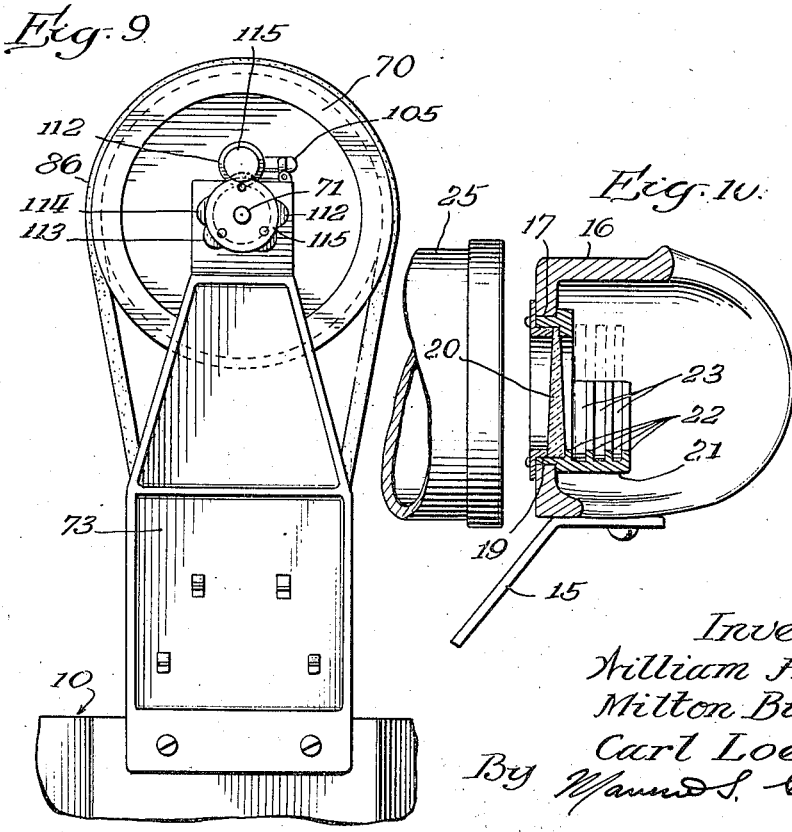

2,152,050

UNITED STATES PATENT OFFICE 2,152,050

OPTICAL INSTRUMENT

William Henning and Milton A. Bursack, Fargo, N. Dak., and Carl Loeb, Chicago, Ill.

Application June 18, 1936, Serial No. 85,840

8 Claims. (Cl. 128—76.5)

This invention relates to optical apparatus of the type employed for orthoptic training and light therapy. Apparatus of this general class are employed for treating and arresting various eye disorders and ailments and for correcting or alleviating certain deformities, defects, or imperfections of vision by employing various well known methods of treatment as now taught at modern optometric clinics and schools, and as practiced by optometrists at the present time.

The apparatus constituting the present invention comprises means by virtue of which a number of well known methods of visual correction may be practiced for stimulating or inhibiting a single or a multiplicity of functions of the eye, such as by using base in and base out prisms; by varying the prism degree; by rotation of the optical set-up from left to right or right to left at a plurality of different speeds; by interchangeability of illuminated targets; by independent control and varying of light intensity from minimum to maximum.

One of the objects of this invention resides in the provision of a novel, simple, compact assembly in a unitary piece of apparatus of a plurality of mechanisms employed for various methods of treatment.

Another object is to provide improved apparatus of the above mentioned character by virtue of which one, two or more different methods of treatment may be given simultaneously.

A further object resides in a novel assemblage of a plurality of means which permits simultaneously performing certain different methods of treatment in a manner so as to obtain the combined results of the respective methods of treatment, or in certain combination treatments obtaining greatly improved or modified results, which are not generally obtainable by employing separately the different types of single modalities.

Still another object is to provide novel apparatus of the above indicated character which facilitates practicing various methods of treatment in a manner effecting substantial saving of time of the optometrist and also the patient and speeding up results.

A still further object of this invention is to provide a novel, simple, compact apparatus which is economical to manufacture.

Still another object resides in the provision of novel apparatus of the above mentioned character which permits practicing various methods of treatment without the necessity of a dark room.

With the foregoing and other objects in view which will appear as the description proceeds, the invention consists in certain novel features of construction, arrangement and combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of my invention, we have illustrated in the accompanying drawings a preferred embodiment thereof, from an inspection of which when considered in connection with the following description, our invention, its mode of construction, assembly and operation, and many of its advantages should be readily understood and appreciated.

Referring to the drawings in which the same characters of reference are employed to indicate corresponding or similar parts throughout the several figures of the drawings:

Figure 1 is a side elevational view of the apparatus embodying the present invention with parts in section to show details of construction;

Fig. 2 is an enlarged vertical section through one of the projector tubes and associated mechanisms;

Fig. 3 is a front or end view of one of the projector tubes showing the calibrated rods for indicating light wave length corresponding to the filter registered with the opening through the tube;

Fig. 4 is an enlarged vertical section showing the adjusting mechanism for the filters, taken as indicated at line 4—4 on Fig. 2;

Fig. 5 is an enlarged horizontal section taken as indicated at line 5—5 on Fig. 2;

Fig. 6 is an enlarged section taken at line 6—6 on Fig. 2 showing the adjustable target and its carrier;

Fig. 7 is a fragmentary face view of the carrier and target, taken as indicated at line 7—7 on Fig. 2;

Fig. 8 is a top plan view of the apparatus;

Fig. 9 is a rear end view of the upper portion of the apparatus;

Fig. 10 is a vertical section through the stereoscopic eye piece, taken at line 10—10 on Fig. 8;

Fig. 11 is a fragmentary section taken at line 11—11 on Fig. 1;

Fig. 12 is a sectional view through the drive connections for the projector tubes, taken as indicated at line 12—12 on Fig. 11;

Fig. 13 is an enlarged fragmentary view of the mercury "interruptor" switch and its mounting, taken as indicated at line 13—13 on Fig. 1;

Fig. 14 are three more or less diagrammatic sectional views of the cam elements which control the frequency of action of the mercury "interruptor" switch; and Fig. 15 is a wiring diagram of the electrical circuit for the apparatus.

The therapeutic effectiveness of the apparatus constituting the present invention has been found to be very high, and to insure a clear understanding of both the character and importance of this invention, and to insure a full understanding of same, it is deemed advisable to mention that the following are some of the physiological changes that can be definitely accomplished with this apparatus, in most cases by a single application or treatment: Stimulation or inhibition of accommodation; stimulation or depression of sensory nerves; stimulation or inhibition of adduction; stimulation or depression of motor nerves; definite relief of a variety of forms of ocular discomfort; relief of accommodative fatigue with subsequent elimination of the necessity of using bifocal lenses.

Referring now in detail to the drawings, the apparatus comprising this invention includes a base 10, which preferably is hollow, and for economy in manufacture, is formed of sheet metal, including a continuous vertical wall 11 of polygonal outline, as may be seen in Fig. 8, and a top 12 rigidly connected thereto. Extending upwardly from the front of said base 10, in an outward direction, is a support 14 to the top of which is connected a bracket 15 carrying a conventional stereoscope head 16 which is provided with a pair of transversely spaced apart apertures 17. The spacing of said apertures corresponds to the normal range of spacing of a pair of eyes, and removably seated in each aperture is a socket 19 carrying a prism 20. Said sockets are each formed with upwardly open substantially semicircular extensions 21 provided with a plurality of internal axially spaced ribs 22. The space between adjacent ribs constitute pockets 23 for receiving interchangeable auxiliary lenses or prism cells, as indicated in dotted lines in Fig. 10. Such construction permits insertion of proper auxiliary lenses (if necessary) for the purpose of stimulating or inhibiting accommodation and adduction, and for the purpose of controlling the various nerve pathways for changing or normalizing conditioned reflexes as taught in certain recognized schools and clinics. The stereoscope head 16 may be adjusted forward or backward as necessary for proper treatment in connection with apparatus hereinafter described, and it may be understood that such adjustment (although not shown) is provided at the connection of the bracket 15 to the support 14.

A pair of projector or stereoscopic tubes 25 are mounted in co-operative relation to the stereoscope head 16, as may be seen in Fig. 8, and the forward ends of said tubes are each provided with an ear 26, supported on an upstanding post 27 on the upper end of the support 14. Said connection to the post may be understood to be equivalent to a universal point and permits independent movement of the rearward portion of either tube toward or away from the other to a desired position of adjustment.

Formed as an integral part of the rear end of each of the tubes 25 is a target housing 29, a light wave filter housing 30, and a light housing 31. Mounted in the forward end of each tube is a lens 33, and at an intermediate portion of the tube is another lens 34. In alignment with said lenses and disposed in the housing 31 is an electric lamp 35. Interposed between said lamp 35 and the end of the projector tube 25 in the housing 29 is a removable target 38 on which is supported one or more of a plurality of interchangeable stereoscopic charts 39. Said target is connected to a carrier 40 which is mounted for vertical adjustment relative to the opening in the projector tube 25 in guideways 41 on the inner walls of the housing 29, as seen in Fig. 6, and said carrier together with the target and charts may be secured in a desired position of adjustment by a thumb screw 42. The carrier 40 is provided with a plurality of arcuate slots 43 through which extend clamping screws 44 of the target which permit rotation of the target and charts in either direction through an angular range of approximately 15° about a central axis for the purpose of studying, training and correcting an eye condition known as cyclophoria. The target is formed with an extension or finger piece 38ª for convenience in manipulating the target and charts, and it is to be understood that the vertical adjustment thereof also permits obtaining either base up or base down prism effect.

For the purpose of practicing spectroband therapy, there is provided in each of the housings 30, which are associated with said projector tubes 25, two sets of light wave filters, indicated generally at 46 and 47 interposed between the lamps 35 and the opening in said projector tube. Said filters are independently adjustable in vertical direction and each includes a carrier or mounting frame 48 confined for slidable movement in guides 30ª of the housing 30.

Mounted in each carrier are a plurality of different colored panels 49 which makes it possible to align or register in the path of the light waves emitted by the lamp 35 a preselected combination of color panels which permit passage therethrough of only light waves of predetermined wave length. Each carrier is provided with a rack 50, and operatively associated with said racks are pinions 51 and 52, respectively, which are carried on shafts 53 and 54, respectively, journaled in the walls of the housing 30, as may be seen in the drawings. The ends of said shafts extend through the wall of the housing and are provided with hand wheels 55 and 56, respectively, so as to permit convenient manual adjustment for raising or lowering the carriers for aligning a desired combination of color panels 49 with the opening of the tube 25. To facilitate the operation of adjusting said carriers so as to permit passage through the tube 25 of only light waves of predetermined lengths, calibrated rods 57 and 58 are connected to the carriers and extend upwardly through the top of the housing 30, as may be seen in Figs. 2 and 3.

Mounted in each of said lamp housing 31 is a reflector 60 surrounding the lamp 35 for directing the light waves toward and through two lenses 61 which concentrate the light waves on the filter panels and target charts. The rearward portion of the housing 31 is provided with openings 62 to permit escape of heat generated by the lamp.

The stereoscopic tubes together with their associated housings 29, 30 and 31 are adjustably connected at their rear ends to an arcuate support 65. Said connections each include a stud 66 projecting rearwardly from the housing 31 and extend through an elongated slot in support 65 and are held in fixed relation thereto by a wing nut 67. Thus, due to the pivotal mounting of the forward end of the tubes on the post 27, the rear end of the tubes and housings may be swung inwardly or outwardly to a desired position of adjustment. It may be understood that the arcuate support is calibrated in prism diopters, and that each tube is adjustable independently of the other through a range of thirty prism diopters. When the rear ends of the stereoscopic tubes diverge "base in" prism effect is obtained, and when said rear ends of the tube converge "base out" prism effect is obtained.

Due to the pivotal mounting and support of the forward end of the stereoscopic tubes on the post 27, the rear ends of said tubes, by virtue of their connections to the arcuate support 65, may be rotated as a unit, in either direction and at varying speeds, as hereinafter described. The support 65 is connected by a brace member 68 to the post 27 for assisting in guiding the support and tubes. The means for rotating said tubes includes a wheel 70 carried on a shaft 71 journaled in a bearing 72 in the upper end of the cast support 73 extending upwardly from the rear side of the base, and mounted on the face of the wheel 70 is a driving member 75 having a laterally extending portion 76 formed with a cavity 77 in which is confined a ball end 78 of a connecting link 79, the opposite end of which is pivoted at 80, to a bracket 81 secured to the back of the arcuate support 65.

As may be seen from Figs. 1, 11 and 12, as wheel 70 rotates, rotary motion is imparted through the above described connections to the support 65 which in turn imparts such motion to the rear ends of the stereoscopic tubes 27. The arcuate path of travel of said tubes may be readily varied, and for this purpose the driving member 75 is supported on a radially extending screw 83 journaled in the bracket 84 secured to the face of the wheel 70. As the screw 83 is rotated by hand piece 83a, the driving member 75, together with its driving connections, are moved toward or away from the axes of the wheel 70 and thus the radius of rotation of said parts may be adjusted as desired for the specific treatment being given.

The wheel 70 may be driven by a belt 86 from a pulley 87 carried on a shaft 88 journaled in bearings 89 and 90 which are secured to the interior of the base 10, as seen in Fig. 1. Axially movable along said shaft 88 is a friction drive wheel 91 engaging a co-operative friction wheel 92, which in turn is driven by a belt 93 from a pulley 94 of an electric motor 95 mounted in the base 10. The speed or rate of rotation of the rear ends of the stereoscopic tubes may be increased or decreased or reversed in rotation depending upon the place of contact of the friction wheel 91 with the wheel 92. The wheel 91 is adapted to be moved axially on its shaft 88 by a yoke 96 having threaded engagement with a screw portion 97 of a shaft 98 journaled at its ends in bearings 99 secured to the housing 10. One end of the shaft 98 extends through the housing 10 at the front side and is provided with a hand wheel 100, and manifestly as said hand wheel is rotated in one direction, the wheel 91 is moved inward towards the center of the wheel 92, thus reducing the revolutions of said wheel 91, and as said wheel is moved outwardly its revolutions are creased. To reverse the direction of rotation of the wheel 91 and the other drive connections, the direction of rotation of the stereoscopic tubes 25, the hand wheel 100 is turned until the wheel 91 moves beyond the center of the co-operative friction wheel 92 and the speed of rotation in this reverse direction is controlled, as above indicated.

For certain kinds of eye treatments it is desirable that the electrical circuit controlling lamps 35 be interrupted at periodic intervals, and for this purpose, a mercury switch 105 is connected in the lamp circuit and is mounted on an arm 106 pivotally connected at 107 to an upstanding lug 108 on the support 73, as may be seen in Fig. 13. Connected to said arm 106 is a rearwardly extending member 110 on which is carried a roller 111 adapted to be adjusted along said member for registration and engagement with the periphery of one of the cams 112, 113 or 114, all of which are secured to the shaft 71 for rotation therewith. Said cams are provided with a different number of high points 112a, 113a, and 114a, respectively, and it may be understood that each time a high point of the cam, which is aligned with said roller, engages the roller, it is raised thereby raising said arm 106 about its pivot and raising the mercury switch 105 for temporarily breaking the lamp circuit. When the roller 111 is adjusted on its supporting member 110 beyond said cams, no movement is imparted to the switch 105, and the lamp circuit remains continuous. To insure proper following of the roller 111 on the surface of the cams, a weight 115 is provided at the outer end of the roller supporting member 110.

The frequency of interruption of the lamp circuit may be varied first by the general speed of rotation of the stereoscopic tubes, and, second, by the particular cam employed for producing a predetermined number of interruptions at a given speed. It may be understood that the cams and mercury switch arrangement is such that the lamps 35 will be illuminated for the greatest intervals of time, and if desired the switch may be reversed so that the lamps are off for the greatest interval of time.

In the wiring diagram illustrated in Fig. 15, the motor 95 is connected to a source of electrical energy by conductor wires 117 and 118 with a control switch 120 interposed in the conductor wire 118. A pilot light 121 is connected across the line by conductor wires 122 and 123 with a switch 124 interposed in the conductor wire 123. The lamps 35 in the stereoscopic tubes 25 are connected in series parallel to main conductor wire 117 by branch conductor wires 126 and 127 which connect to a common conductor 128 connected to the mercury switch 105 with a rheostat 130 interposed therein. The rheostat affords a complete range of light intensity as mentioned hereinafter and may be located at any convenient place on the machine. The other terminal of the mercury switch is connected to the main conductor wire 118 by a conductor 131 having a control switch 132 interposed therein. By virtue of this arrangement it will be apparent that the motor 95 and lamps 35 may be operated independently of each other, and by the provision of the rheostat 130 it is possible to vary the intensity of the light of the lamps 35. If desired, the electrical circuit may be such that the lamps may be alternately illuminated, or manually operable means may be provided for interrupting the lamp circuits irrespective of whether or not the motor circuit is functioning.

By virtue of the apparatus above described it is possible to practice various eye treatments without the necessity of a dark room; to employ independent light control over any degree, from the brightest tolerable to practically indiscernible visibility; to control light wave frequencies for treating the eyes; to provide independent treatment for each eye which may include different light wave lengths, and if desired, such treatments may be combined with others and may also be employed simultaneously with the use of certain lenses and prisms between the light source and the eye for producing certain functional changes; and to employ a continuous or interrupted treatment of a predetermined number of frequencies. As above indicated, it is also possible to combine various treatments which in some instances may effect a more improved and/or more permanent result as well as facilitating practicing of the treatments and saving time of both the patient and optometrist.

It is believed that our invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of our invention as defined in the appended claims.

What we claim and desire to secure by Letters Patent of the United States is:

1. Apparatus of the character described comprising a support, a pair of spaced apart stereoscopic tubes pivotally mounted adjacent their forward ends on said support, a housing connected to the rear ends of each of said tubes, an electric lamp in each housing adjacent the rear end of said tubes, a support connecting the respective housings, and driving means including a connection to said last mentioned support for rotating the rear ends of said tubes about said pivotal connection.

2. Apparatus of the character described comprising a support, a pair of spaced apart stereoscopic tubes pivotally mounted adjacent their forward ends on said support, a housing connected to the rear ends of each of said tubes, an electric lamp in each housing adjacent the rear end of said tubes, a support connecting the respective housings, and driving means including a connection to said last mentioned support for rotating the rear ends of said tubes about said pivotal connection, said driving means including means for increasing or decreasing the arcuate path of rotation of the rear ends of said tubes.

3. Apparatus of the character described comprising a support, a pair of spaced apart stereoscopic tubes pivotally mounted adjacent their forward ends on said support, a housing connected to the rear ends of each of said tubes, an electric lamp in each housing adjacent the rear end of said tubes, a support connecting the respective housings, driving means including a connection to said last mentioned support for rotating the rear ends of said tubes about said pivotal connection, and means for varying the speed of rotation of the rear ends of said tubes.

4. Apparatus of the character described comprising a support, a pair of spaced apart stereoscopic tubes pivotally mounted adjacent their forward ends on said support, a housing connected to the rear ends of each of said tubes, an electric lamp in each housing adjacent the rear end of said tubes, a support connecting the respective housings, driving means including a connection to said last mentioned support for rotating the rear ends of said tubes about said pivotal connection, means for varying the speed of rotation of the rear ends of said tubes, and means for interrupting the lamp circuits at periodic intervals, in timed relation to the speed of rotation of the rear ends of said tubes.

5. Apparatus of the character described comprising a support, a pair of spaced apart stereoscopic tubes pivotally mounted adjacent their forward ends on said support, a housing connected to the rear ends of each of said tubes, an electric lamp in each housing adjacent the rear end of said tubes, a support connecting the respective housings, light wave filter means in each housing intermediate said lamp and the rear end of the tube, and driving means including a connection to said last mentioned support for rotating the rear ends of said tubes about said pivotal connection.

6. Apparatus of the character described comprising a support, a pair of spaced apart stereoscopic tubes pivotally mounted adjacent their forward ends on said support, a housing connected to the rear ends of each of said tubes, an electric lamp in each housing adjacent the rear end of said tubes, a support connecting the respective housings, light wave filter means in each housing intermediate said lamp and the rear end of the tube, separate charts in each housing disposed intermediate said filter means and the rear end of the tube and in registration with the opening of the tube, and driving means including a connection to said last mentioned support for rotating the rear ends of said tubes about said pivotal connection.

7. Apparatus of the character described comprising a support, a pair of spaced apart stereoscopic tubes pivotally mounted adjacent their forward ends on said support, a housing connected to the rear ends of each of said tubes, an electric lamp in each housing adjacent the rear end of said tubes, a support connecting the respective housings, means for interrupting the electric lamp circuits at periodic intervals, light wave filter means in each housing intermediate said lamp and the rear end of the tube, and driving means including a connection to said last mentioned support for rotating the rear ends of said tubes about said pivotal connection.

8. Apparatus of the character described comprising a support, a pair of spaced apart stereoscopic tubes pivotally mounted adjacent their forward ends on said support, a housing connected to the rear ends of each of said tubes, an electric lamp in each housing adjacent the rear end of said tubes, a support connecting the respective housings, means for interrupting the electric lamp circuits at periodic intervals, light wave filter in each housing intermediate said lamp and the rear end of the tube, separate charts in each housing disposed intermediate said filter means and the rear end of the tube and in registration with the opening of said tube, and driving means including a connection to said last mentioned support for rotating the rear ends of said tubes about said pivotal connection.

WILLIAM HENNING.
MILTON A. BURSACK.
CARL LOEB.